(12) United States Patent
Son et al.

(10) Patent No.: US 10,967,207 B2
(45) Date of Patent: Apr. 6, 2021

(54) RESPIRATOR WITHOUT BREATHING RESISTANCE

(71) Applicants: Ewha University—Industry Collaboration Foundation, Seoul (KR); Korea University Research and Business Foundation, Seoul (KR)

(72) Inventors: Ah Jeong Son, Seoul (KR); Beelee Chua, Seoul (KR); Mi Ri Park, Yongin-si (KR); Min Kyoung Lee, Goyang-si (KR)

(73) Assignees: Ewha University—Industry Collaboration Foundation, Seoul (KR); Korea University Research and Business Foundation, Seoul (KR)

( * ) Notice: Subject to any disclaimer, the term of this patent is extended or adjusted under 35 U.S.C. 154(b) by 1133 days.

(21) Appl. No.: 15/354,647

(22) Filed: Nov. 17, 2016

(65) Prior Publication Data

US 2017/0136270 A1     May 18, 2017

(30) Foreign Application Priority Data

Nov. 17, 2015   (KR) .......................... 10-2015-0161168

(51) Int. Cl.
*A62B 23/02*      (2006.01)
*B03C 3/04*      (2006.01)
(Continued)

(52) U.S. Cl.
CPC .............. *A62B 23/02* (2013.01); *A62B 9/006* (2013.01); *A62B 18/025* (2013.01); *B01D 53/32* (2013.01);
(Continued)

(58) Field of Classification Search
CPC ....... A62B 23/02; A62B 9/006; A62B 18/025; B01D 53/32; B01D 53/8675; B03C 3/04; B03C 3/08; B03C 3/155
(Continued)

(56) References Cited

U.S. PATENT DOCUMENTS

2006/0272505 A1* 12/2006 Tanaka ...................... B03C 3/41
96/96

FOREIGN PATENT DOCUMENTS

KR    20-2009-0005015 U    5/2009
KR    10-2011-0060093 A    6/2011

* cited by examiner

*Primary Examiner* — Phillip A Gray
(74) *Attorney, Agent, or Firm* — John P. White

(57) ABSTRACT

The present invention relates to a respirator without breathing resistance, which has an air inlet duct that passes through an inside and an outside of the respirator and that has asymmetrical electrodes and particle capturing plates formed on an inner surface of the air inlet duct; ozone removing element that removes ozone generated by microplasma; and high voltage dc-dc converter that provides high voltage to the asymmetrical electrodes. It employs asymmetrical electrodes and particle capturing plates to filter air without generating breathing resistance. When the respirator according to the present invention is used, safety of a wearer may be maintained in accordance with an environment and breathing may be smoothly performed even while introduction of pathogenic bacteria, viruses, fungi, spores, fine dust, or the like included in air may be effectively blocked. Accordingly, the respirator may be widely utilized to maintain the safety of the wearer in various environments.

20 Claims, 9 Drawing Sheets

(51) Int. Cl.
*B03C 3/155* (2006.01)
*B03C 3/41* (2006.01)
*B03C 3/47* (2006.01)
*B03C 3/60* (2006.01)
*A62B 18/02* (2006.01)
*A62B 9/00* (2006.01)
*B03C 3/08* (2006.01)
*B01D 53/32* (2006.01)
*B01D 53/86* (2006.01)

(52) U.S. Cl.
CPC ............ *B01D 53/8675* (2013.01); *B03C 3/04* (2013.01); *B03C 3/08* (2013.01); *B03C 3/155* (2013.01); *B03C 3/41* (2013.01); *B03C 3/47* (2013.01); *B03C 3/60* (2013.01); *B01D 2255/2073* (2013.01); *B01D 2257/106* (2013.01); *B01D 2257/91* (2013.01); *B01D 2258/06* (2013.01); *B01D 2259/4533* (2013.01); *B01D 2259/4541* (2013.01); *B03C 2201/04* (2013.01)

(58) Field of Classification Search
USPC .................................................... 128/206.12
See application file for complete search history.

FIG. 7

RESPIRATOR WITHOUT BREATHING RESISTANCE

CROSS-REFERENCE TO RELATED APPLICATION

This application claims priority from and the benefit under 35 U.S.C. § 119(a) of Korean Patent Application No. 10-2015-0161168, filed on Nov. 17, 2015, which is hereby incorporated by reference for all purposes as if fully set forth herein.

BACKGROUND OF THE INVENTION

1. Field of the Invention

The present invention relates to a respirator without breathing resistance. In particular, the present invention relates to a respirator without breathing resistance, which has an air inlet duct that passes through an inside and an outside of the respirator and that has asymmetrical electrodes and particle capturing plates formed on an inner surface of the air inlet duct; ozone removing element that removes ozone generated by micro-plasma; and high voltage dc-dc converter that provides high voltage to the asymmetrical electrodes. It employs asymmetrical electrodes and particle capturing plates to filter air without generating breathing resistance.

2. Description of the Prior Art

In general, a respirator is a personal equipment that covers respiratory organs such as a nose and a mouth to prevent inhalation of airborne contaminants such as pathogenic bacteria, viruses, spores, dust and the like for personal protection. It is worn by an individual who works in a hospital or a hazardous working environment to prevent inhalation of hazardous airborne contaminants. Respirators are also worn by general population to prevent infection and spread of seasonal influenza, avian influenza, novel influenza, MERS or the like, which are acute airborne respiratory diseases with huge social-economic implications and costs.

The existing respirators such as the common N95, R99 and P100 masks are based solely on mechanical filtration via diffusion, impaction and passive electrostatic attraction. The technology development is progressing along developing new fiber materials as well as functionalizing the fiber's surfaces. For example, a respirator in which an active carbon sheet formed by one of active carbon, active carbon fiber and active carbon paper to which functionality is assigned by subjecting insides thereof to silver/iodine surface treatment or a combination thereof is installed in a filter media layer. This allowed the respirator filter to possess bactericidal function of killing airborne pathogens upon contact during the inhalation of external air as disclosed in Korean Utility Model Application Publication No. 2009-0005015. However, it is still based on mechanical filtration. There are also powered personal respirators which employed large blower fans to overcome the breathing resistance. But its size, cost, noise and power requirement makes its unsuitable for popular use.

Most existing respirators employed mechanical filtration mechanisms such as diffusion, impaction and passive electrostatic attraction, for the removal of airborne contaminants. This result in the presence of significant breathing resistance due to the pressure drop across the filtration medium and it makes breathing difficult, especially for children, sick and elderly people. In other words, the breathing resistance in existing respirators discourages its usage.

With this background, the present inventors have made an effort to develop a respirator that allows smooth breathing with no breathing resistance while effectively filtering pathogenic bacteria, viruses, fungi, spores, fine dust, or the like. As a result, the present inventors have identified that when a respirator is used which has an air inlet duct that transfers external air to a wearer without breathing resistance instead of a filter provided in the respirator according to the related art, wherein asymmetrical electrodes and particle capturing plates are provided on an inner surface of the air inlet duct, airborne pathogenic bacteria, viruses, fungi, spores, fine dust, or the like may be effectively removed from the air stream even while breathing is smoothly performed, and have thereby completed the present invention.

SUMMARY OF THE INVENTION

The present inventors have developed a respirator that filters air without a mechanical filter, which is the source of breathing resistance.

That is, the present inventors have sought a method of effectively filtering pathogenic bacteria, viruses, fine dust, or the like that may be introduced through an unobstructed air inlet duct, in a state in which it is assumed that when the air inlet duct which passes through an inside and an outside of the respirator is provided at a portion of the respirator, external air is introduced through the air inlet duct so that breathing may be smoothly performed. As a result, the present inventors have developed a respirator that has asymmetrical electrodes and particle capturing plates formed on an inner surface of the air inlet duct.

In detail, the asymmetrical electrodes and particle capturing plates are provided on the inner surface of the air inlet duct, as means for removing pathogenic bacteria, viruses, fungi, spores, fine dust, or the like from the air stream before a wearer inhales the said air stream introduced through the air inlet duct. The micro-plasma generated by using the asymmetrical electrodes electrically charges airborne fine particles including pathogenic bacteria, viruses, fungi, spores, fine dust, or the like. The electrically charged fine particles are removed from the air stream as they pass through the electric field of the particle capturing plates and deposited on the surface of the particle capturing plates.

Upon appropriate electrical stress provided by a high voltage source, a micro-plasma can be generated by using the asymmetrical electrodes and confined at the surface of the electrode with the highest electric field strength. The asymmetry ensures the confinement of the micro-plasma and hence limits the electrical current and power consumption by the respirator. The asymmetrical electrodes can be achieved via a variety of geometrical means such as pin-to-plane, wire-to-plane, wire-in-cylinder and with a variety of electrically conductive materials such as metals and conductive polymers. It is understood that the specific geometrical dimensions can be optimized.

The respirator provided in the present invention has advantages in that an unobstructed air inlet duct is provided in the respirator so that air flows freely while the airborne fine particles are filtered by the asymmetrical electrodes and particle capturing plates in the air inlet duct, as compared with the respirator according to the related art. The respirator having such advantages was completely unknown in the past and has been developed for the first time by the present inventors.

In order to achieve the above objectives, an aspect of the present invention is to provide a respirator that includes: (a) a body; (b) an unobstructed air inlet duct that is provided at a portion of the body, passes through an inside and an outside of the body; (c) an asymmetrical electrode that generates a micro-plasma and a particle capturing plate formed on an inner surface of the air inlet duct; (d) an ozone removing element, within the air inlet duct downstream of the asymmetrical electrodes and particle capturing plates, that removes ozone generated by the micro-plasma; and, (e) a high voltage dc-dc converter within the body to provide high voltage to power the asymmetrical electrodes.

The core feature of the respirator provided in the present invention is an unobstructed air inlet duct, with micro-plasma and particle capturing plates on the inner surface, that passes through the inside and the outside of the body of the respirator. Since the air inlet duct is unobstructed, the air stream does not experience flow resistance and hence no breathing resistance is experienced by the wearer. Accordingly, the respirator provided in the present invention has an advantage in that the air flow introduced to the wearer through the respirator is not obstructed (FIG. 1). FIG. 1 is a schematic view illustrating the air flow introduced to a wearer is obstructed by the mechanical filter when the respirator according to the related art is used and the air flow introduced to the wearer unobstructed when the respirator according to the present invention is used. As illustrated in FIG. 1, when the respirator according to the related art is used, the air flow introduced to the wearer is obstructed due to a mechanical filter. However, because the respirator provided in the present invention employs a micro-plasma and particle capturing plates to filter air instead of a mechanical filter, the air flow introduced to the wearer is not obstructed when the respirator according to the present invention is used.

The term "body" in the present invention refers to a portion of the respirator, which is mounted on a face while being in direct contact with a mouth and a nose of a person to cover the mouth and the nose.

The term "air inlet duct" in the present invention refers to means that passes through the inside and the outside of the body of the respirator to allow air flow to a wearer. The air inlet duct does not include a mechanical filter provided in the general respirator, hence unobstructed, and thus achieves an effect of no breathing resistance by unobstructed air flow. At the same time, the asymmetrical electrodes, particle capturing plates and ozone removing element are provided on an inner surface of the air inlet duct, making it possible to remove fine particles, such as pathogenic bacteria, viruses, fungi, spores or fine dust, included in air introduced through the air inlet duct. It is understood that a plurality of asymmetrical electrodes and particle capturing plates may also be employed in different configurations.

At this time, an optimum condition may be achieved by changing conditions including the cross section geometry, the length, surface roughness, and the three-dimensional structure of the air inlet duct, a mounting position of the asymmetrical electrodes, particle capturing plates and ozone removing element provided on the inner surface of the air inlet duct, or the like by those skilled in the art to improve efficiency at which fine particles including pathogenic bacteria, viruses, fungi, spores, fine dust, or the like are removed at an micro-plasma operation level at which the wearer of the respirator is not adversely influenced.

As an example, the air inlet duct of the present invention has a bent portion in the center thereof, making it possible to improve removal efficiency for various fine particles included in the introduced air even while an amount of introduced air is not limited.

The term "micro-plasma" in the present invention refers to a phenomenon in which ionized air is concentrated on a surface of one of asymmetrical electrodes when electric power having a high voltage is supplied to the asymmetrical electrodes consisting of a pin electrode and a plate electrode. An electron or positive electrical cloud may be generated depending on the asymmetrical electrodes. The positive electrical cloud may electrically charge airborne fine particles, which pass through the same (FIG. 2). FIG. 2 is a picture depicting the micro-plasma generated in the asymmetrical electrodes provided in the respirator according to the present invention.

The asymmetrical electrodes can consist of a pin electrode and a plate electrode. The micro-plasma is generated on the pin electrode so that forms an asymmetrical electric field. Materials of the asymmetrical electrodes are not particularly limited as long as they have characteristics of electrical conductors. As an example, the materials may be a metal such as copper, gold, aluminum and steel, atoms corresponding to group IV of the periodic table (silicon, carbon, and the like), glass having conductivity, polymers, and the like. As another example, the pin electrode can be made of stainless steel and the plate electrode can be made of aluminum.

In particular, airborne fine particles, which are negatively charged by the micro-plasma in the pin electrode, may drift toward the particle capturing plates having a positive polarity and be adsorbed thereto as they pass between the particle capturing plates. Likewise, airborne fine particles, which are positively charged by the micro-plasma, may drift toward the particle capturing plates having a positive polarity and be adsorbed thereto as they pass between the particle capturing plates.

The term "particle capturing plate" in the present invention refers to a set of linearly or cylindrically parallel plates, between which an electric field having an opposite polarity to the airborne fine particles, which are charged by the micro-plasma, may be formed (FIG. 1). As the airborne fine particles, which are charged by the micro-plasma, pass between the particle capturing plates, the charged fine particles drift toward the particle capturing plates and are adsorbed thereto by the electrical field formed in the particle capturing plates.

A material of the particle capturing plate is not particularly limited as long as it also has characteristics of the conductor. As an example, the material may be a metal such as copper, gold, aluminum, and steel, atoms corresponding to group IV of the periodic table (silicon, carbon, and the like), glass having conductivity, polymers or the like. As another example, the material may be stainless steel or aluminum.

As an example, the arrangement between the asymmetrical electrodes and particle capturing plates may be optimized such that maximum air mixing of the fine particles and electrical cloud of the micro-plasma generated by asymmetrical electrodes is achieved prior to passing between the particle capturing plates. This will allow the fine particles to acquire maximum electrical charge prior to passing through the particle capturing plates (FIG. 1). Hence the filtration efficiency can be improved.

Meanwhile, the micro-plasma may electrically charge the airborne fine particles, and at the same time, may also generate ozone by converting oxygen in the air into the ozone. It is known that ozone at a predetermined concentration is beneficial to a person because of a sterilizing effect, but when a person is exposed to ozone at averagely 0.700 ppm or higher for eight hours (EPA standard), respiratory diseases may occur. Thus, because the ozone may provide a hazardous effect to a respirator wearer by itself, an ozone removing element provided in the respirator according to the present invention removes the ozone generated in this way so that the respirator according to the present invention may be more safely used.

The element for removing ozone is not particularly limited as long as it may remove ozone generated by the micro-plasma and, at the same time, does not obstruct the air flow of the air inlet duct or its function. As an example, the element may be a film or a three-dimensional mesh formed of or coated with manganese oxide or manganese dioxide.

The manganese oxide reacts with ozone to form manganese dioxide, and the manganese dioxide refers to catalyst activation that converts ozone into oxygen. Thus, when the element for removing ozone is provided downstream with respect to a position where the asymmetrical electrodes and particle capturing plates are provided in the air inlet duct, various fine particles included in air introduced through the air inlet duct and ozone generated in the micro-plasma may be removed together.

The form of the manganese oxide or manganese dioxide is not particularly limited as long as it does not hinder flow of the air introduced through the air inlet duct. As an example, the form of the manganese oxide or manganese dioxide is a surface film, a mesh filter, three-dimensional scaffold, and etc. As another example, the filter may have a form in which powder of manganese oxide or manganese dioxide is coupled to a mesh type filter formed of aluminum or polylactic acid. For example, the filter may be manufactured by producing a mesh type filter formed of aluminum and coating the filter with manganese oxide or manganese dioxide.

The term "high voltage DC-DC converter" in the present invention refers to a transformer that may generate an output high DC voltage of up to several kilovolts from an input DC voltage of up to several volts. The high voltage DC-DC converter may generate the micro-plasma from the asymmetrical electrodes by supplying a voltage to the asymmetrical electrodes. For example, the high voltage DC-DC converter according to the present invention may generate an output high DC voltage of up to 1.5 to 5.0 kilovolts from an input low DC voltage of 5 volts or less to provide the high DC voltage to the asymmetrical electrodes.

Because the micro-plasma is generated by the high voltage supplied by the high voltage DC-DC converter, contact between the generated micro-plasma and a user is prevented, so that safety of the user may be achieved. Accordingly, the respirator according to the present invention may further include an inlet guard element that may prevent contact between the generated micro-plasma and the body of the user.

The asymmetrical electrodes that generate the micro-plasma are located in front of the air inlet duct. Thus, when the body of the user comes into contact with the micro-plasma generated in the asymmetrical electrodes, the user may be injured. To prevent such injury, the inlet guard element that may prevent the contact with the body of the user is additionally provided in front of the asymmetrical electrodes so that the safety of the user may be achieved.

As yet another example, the respirator of the present invention may further include a power supply element that supplies electric power to the high voltage dc-dc converter.

The term "power supply element" in the present invention refers to an apparatus that supplying electric power to the high voltage dc-dc converter. The power supply element is not particularly limited as long as they supply low level electric power to the high voltage dc-dc converter. As an example, the power supply element may be batteries, a mobile device, and the like.

The micro-plasma that is generated in the asymmetrical electrodes provided in the respirator according to the present invention directly serves to remove the airborne fine particles, but because it is operated by electric power supplied by the high voltage DC-DC converter, it may be configured to minimize consumption of the electric power. In particular, as a concentration of the micro-plasma is adjusted depending on a concentration of the airborne fine particles such that a wearer is not affected even while various fine particles included in the air introduced along the air inlet duct are removed, an amount of consumed electric power may be optimized. To this end, the respirator according to the present invention may further include an air quality feedback element that may optimize the amount of consumed electric power by adjusting the concentration of the micro-plasma depending on the concentration of the airborne fine particles. The air quality feedback element includes an optical sensor that may measure the concentration of the airborne fine particles and a voltage control module that may adjust the high voltage DC-DC converter. Here, the voltage control module may be wire or wirelessly operated.

After the concentration of the airborne fine particles is measured by using an optical sensor included in the air quality feedback element, a level of a voltage supplied by the high voltage DC-DC converter is adjusted by using the voltage control module depending on the measured concentration of the fine particles so that removal efficiency of the airborne fine particles may be optimized (FIG. 9). For example, when it is identified that the concentration of the airborne fine particles is relatively low, as the level of the voltage supplied by the high voltage DC-DC converter is lowered, the intensity of the micro-plasma is reduced, and accordingly, an amount of consumed electric power may be reduced. In contrast, when it is identified that the concentration of the airborne fine particles is relatively high, as the level of the voltage supplied by the high voltage DC-DC converter is increased, the intensity of the micro-plasma is increased, and accordingly all of the airborne fine particles may be removed.

In addition, the air quality feedback element may further include various signal transfer elements such as a warning alarm and an LED indicator light. For example, when it is identified by the optical sensor that fine particles having a level that may provide a harmful effect to the user are present in the air, a warning sound is generated through the alarm so that the user may be guided to move away from a current area.

Further, the air quality feedback element may display on a mobile device the current concentration of the airborne fine particles and the voltage of the micro-plasma being used, thereby assisting the user to effectively use the respirator.

Hereinafter, a configuration of the respirator provided in the present invention will be described in detail with reference to the accompanying drawings.

FIG. 3A illustrates a use state of the respirator provided in the present invention, and FIG. 3B is an exploded perspective view illustrating the air inlet duct included in the respirator. Reference numeral 1 refers to a body which may be mounted on a face to cover a nose and a mouth of a person, and reference numeral 2 refers to the air inlet duct that serves to transfer external air to the mouth and the nose of the person, which are in close contact with the respirator.

The air inlet duct 2 is configured to have a form of a channel through which air may flow unobstructed, so that an amount of air supplied to a person is substantially the same regardless of whether the respirator is worn. Further, the air inlet duct 2 may include a separating plate 26 therein. The separating plate 26 partitions an internal space of the air inlet duct 2 so that the air inlet duct 2 may include a bent portion that is bent in a bending scheme, in the interior thereof. The bent portion reduces an inflow velocity of foreign matters that are introduced through the air inlet duct 2, thereby removal efficiency of the foreign matters may be increased.

In addition, the air inlet duct 2 may include asymmetrical electrodes 21, particles capturing plates 24 and an inlet guard element 25, and the like, that are adapted to remove the airborne fine particles.

Further, the air inlet duct 2 includes a high voltage DC-DC converter 22 for supplying electric power to the asymmetrical electrodes 21.

Further, the air inlet duct 2 includes an ozone removing element 23 for removing ozone generated by the micro-plasma generated in the asymmetrical electrodes. The ozone removing element may be located downstream of the air flow of the particle capturing plates 24.

Preferably, the air inlet duct 2 may sequentially include the inlet guard element 25, the asymmetrical electrodes 21, the particle capturing plates 24 and the ozone removing element 23.

After the respirator according to the present invention is mounted, when a wearer inhales external air including various fine particles, the fine particles are electrically charged by the micro-plasma while the inhaled air passes through a front side of the asymmetrical electrodes that generate the micro-plasma, the charged fine particles are adsorbed to the particle capturing plates that form a separate electric field and are thus removed from the air. After ozone generated by the micro-plasma is removed by the ozone removing element, clean air from which the fine particles and the ozone have been may be inhaled by the wearer.

When a respirator according to the present invention is used, the wearer is protected from airborne fine particles including pathogenic bacteria, viruses, fungi, spores, and dust while breathing with ease in absence of breathing resistance. Accordingly, the respirator may be widely used to maintain the safety of the wearer in various embodiments.

BRIEF DESCRIPTION OF THE DRAWINGS

The above and other objects, features and advantages of the present invention will be more apparent from the following detailed description in conjunction with the accompanying drawings, in which:

FIG. 7 is a schematic view illustrating a method for evaluating the filtration efficiency of the respirator having the an asymmetrical electrode a particle capturing plate and a ozone removing element formed therein;

DETAILED DESCRIPTION OF THE EXEMPLARY EMBODIMENTS

Hereinafter, the present invention will be described in detail through embodiments. However, these embodiments are made to exemplarily describe the present invention, and the scope of the prevent invention is not limited to the embodiments.

Example 1

Manufacture of Respirator Having Manganese Dioxide Film and Evaluation of Effect Thereof Example 1-1

Manufacture of Manganese Dioxide Film Used in the Respirator Thereof

The manganese dioxide film is manufactured to have a size of 2 cm×2 cm and a thickness of 1 mm or thicker by coupling manganese dioxide powder to a polyester substrate through spray coating using adhesive such as Z-16 clear binder or UV cure binder, or inkjet printing.

Figure 1:
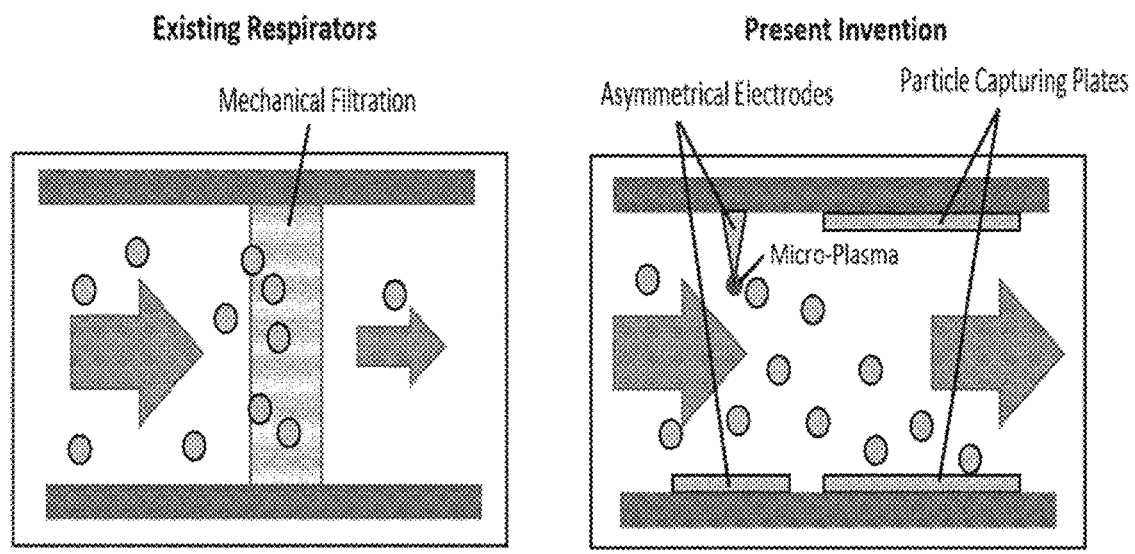
FIG. 1 is a schematic view illustrating the obstructed air flow introduced to a wearer when the respirator according to the related art is used and the unobstructed air flow introduced to the wearer when a respirator according to the present invention is used.
Figure 2:
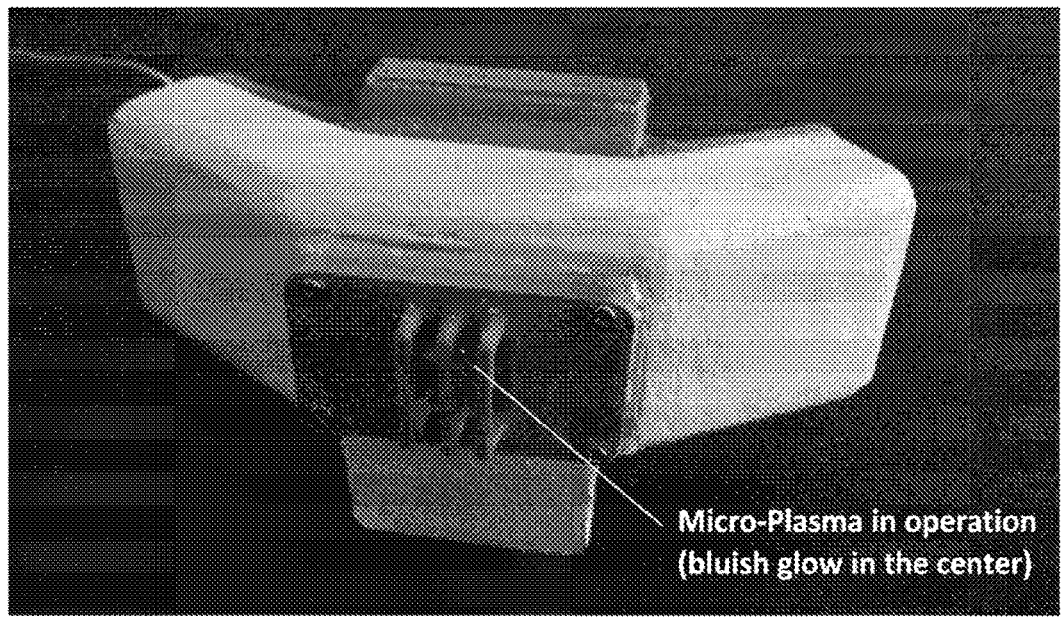
FIG. 2 is a picture illustrating showing the micro-plasma provided in the respirator according to the present invention.
Figure 3A:
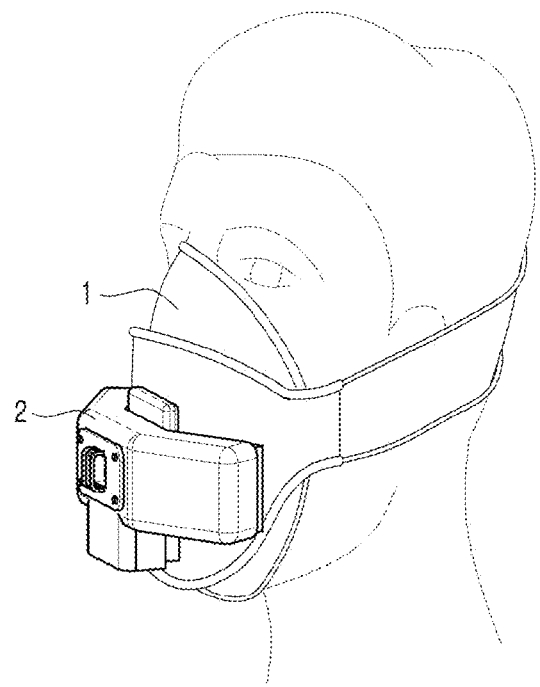
FIG. 3A illustrates a use state of the respirator provided in the present invention.
Figure 3B:
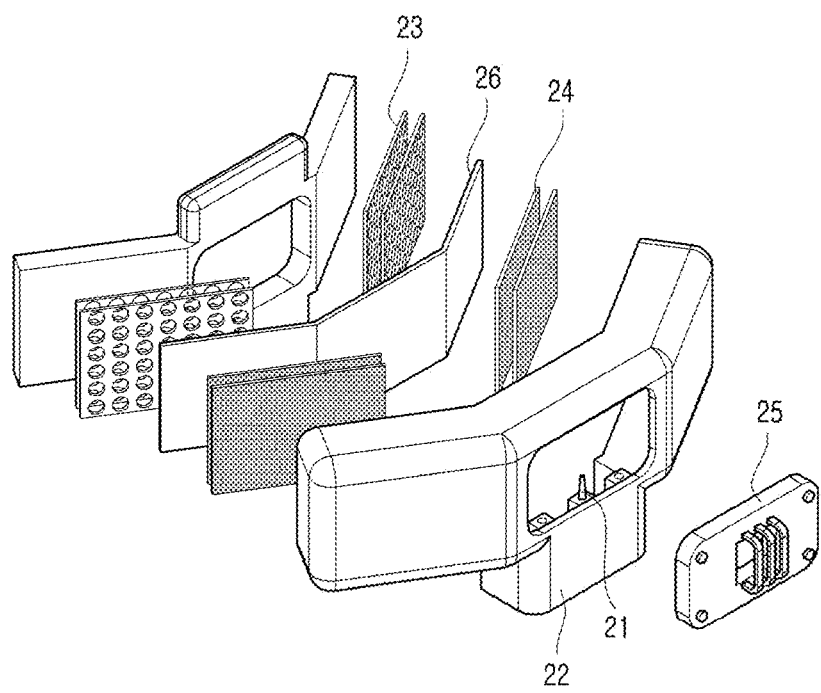
FIG. 3B is an exploded perspective view illustrating an air inlet duct included in the respirator provided in the present invention.
Figure 4:
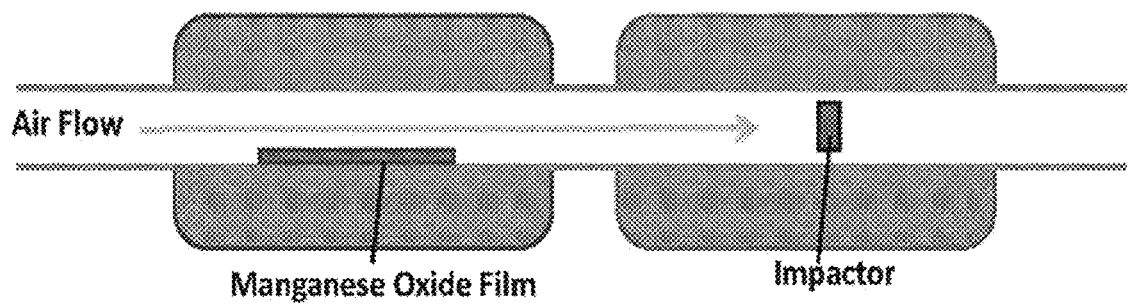
FIG. 4 is a schematic view illustrating an outline of an experimental method for performing a test for coupling force of a manganese dioxide film.

To perform the test for coupling force, air flows at a speed of 100 LPM or faster and manganese dioxide particles are detected by an impactor (FIG. 4)

FIG. 4 is a schematic view illustrating an outline of an experimental method for performing a test for coupling force of a manganese dioxide film. As illustrated in FIG. 4, with regard to various air velocities, the manganese dioxide particles represent entrainment of 2.25 mg/m$^3$ or more.

Example 1-2

Measurement of Ozone Removing Efficiency of Manganese Dioxide Film Used

Figure 5:
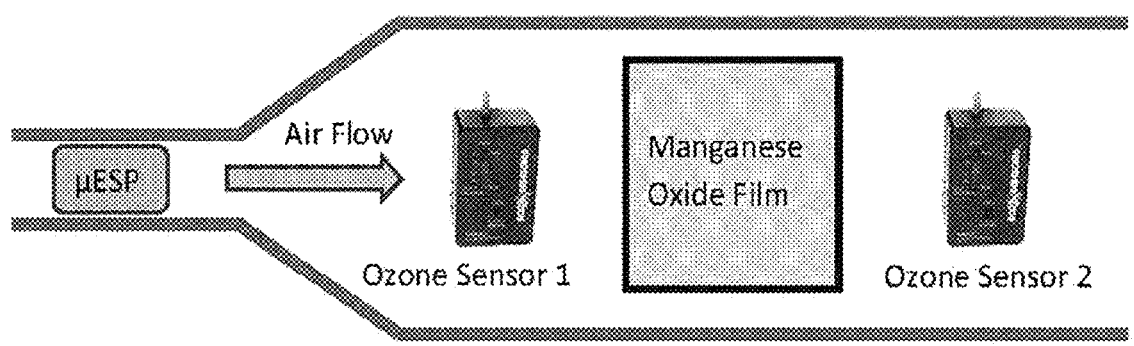
FIG. 5 is a schematic view illustrating a method for measuring ozone removal efficiency of the manganese dioxide film.

The micro-plasma is generated via asymmetrical electrodes and powered by high voltage dc-dc converter. The manganese dioxide film is mounted to an air channel and is connected downstream of the asymmetrical electrodes, as illustrated in FIG. 5. At this time, the height of the air channel is set to be 3 mm. An effect of the manganese dioxide film is measured using two ozone sensors while a voltage supplied to the asymmetrical electrodes and a flow rate of air supplied thereto are changed.

FIG. 5 is a schematic view illustrating a method for measuring ozone removal efficiency of the manganese dioxide film. As illustrated in FIG. 5, it is identified that a concentration of ozone measured by an ozone sensor 2 is increased in proportion to the flow rate of the air supplied to the asymmetrical electrodes and its supplied voltage, and the maximum concentration of ozone measured by the ozone sensor 2 should be lower than 0.07 ppm.

Example 1-3

Figure 6:
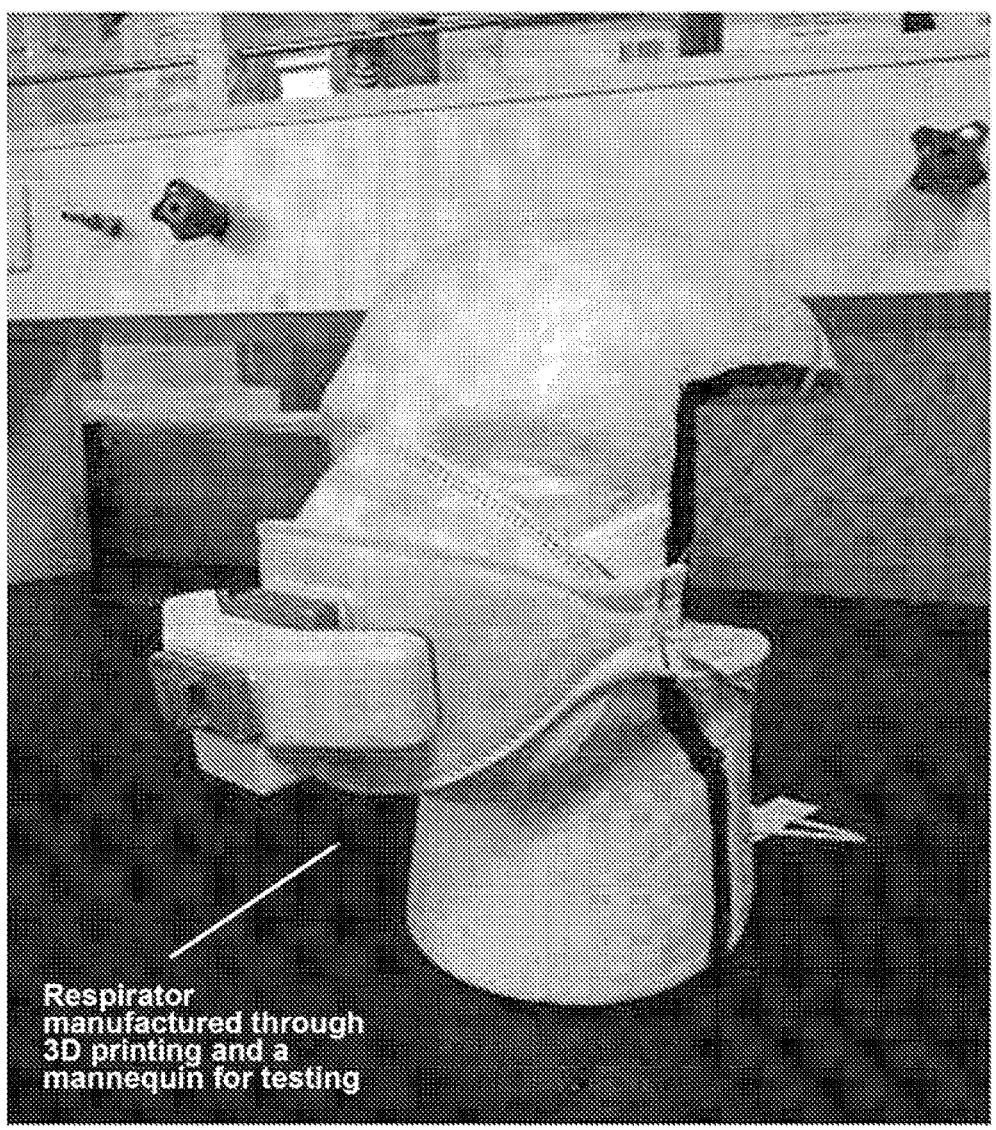
FIG. 6 is a picture illustrating a respirator manufactured through 3D printing and a mannequin for the test.

Insertion of and Test for Manganese Dioxide Film of Respirator with Asymmetrical Electrodes for Micro-Plasma and Particle Capturing Plates A body of the respirator having asymmetrical electrodes and particle capturing plates is designed and is manufactured through 3D printing, and the asymmetrical electrodes and particle capturing plates and the manganese dioxide film are mounted on the interior of the manufactured body (FIG. 6). FIG. 6 is a picture illustrating the respirator manufactured through 3D printing and a mannequin for a test. Non-pathogenic bacteria are used as aerosols for the test. The filtration efficiency of the respirator having the asymmetrical electrodes and particle capturing electrodes is evaluated using a detector having an agar plate. The ozone sensors are also used for monitoring a level of ozone (FIG. 7).

Figure 7:
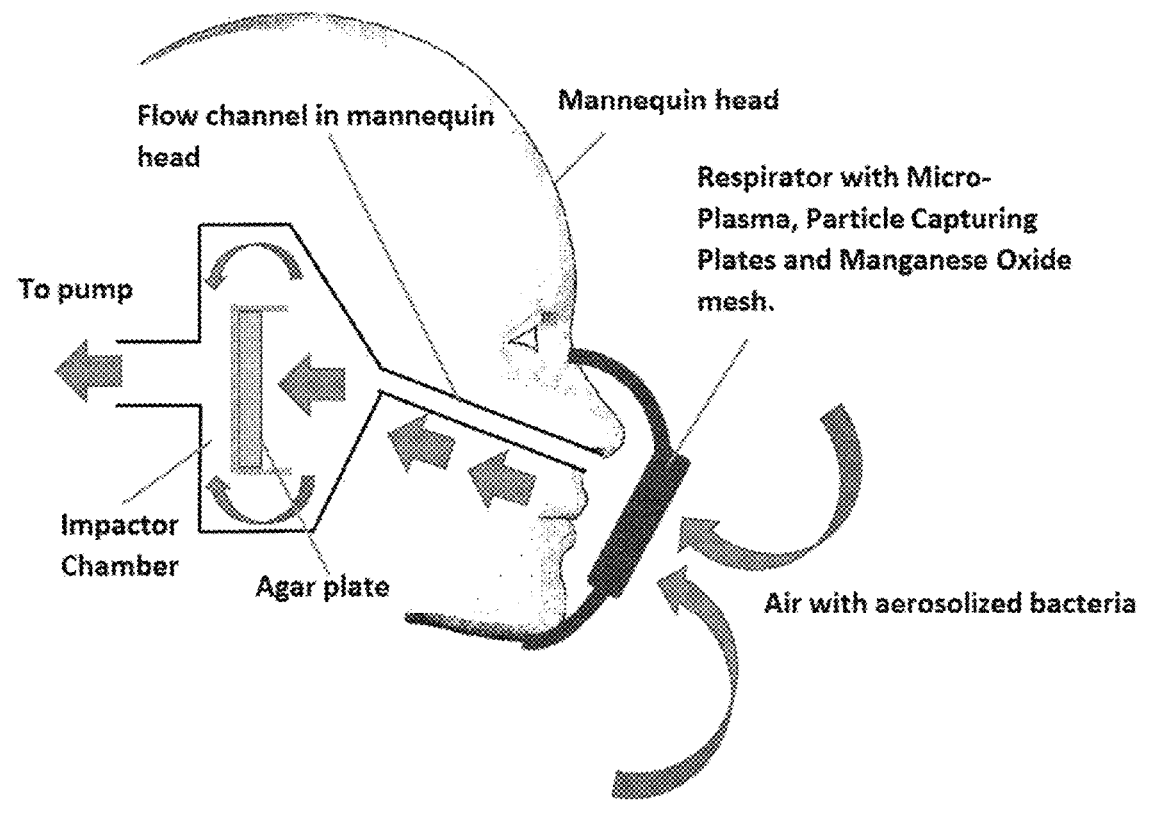

FIG. 7 is a schematic view illustrating a method of evaluating the filtration efficiency of the respirator having the asymmetrical electrodes and particle capturing plates. When the method of FIG. 7 is used, the concentration of ozone is lower than 0.03 ppm. The growth of micro-organism colony on the agar will be indicative of the filtration efficiency of the respirator.

Example 2

Manufacture of Respirator Having Ozone Removing Filter Including Manganese Oxide and Evaluation of Effect Thereof Example 2-1

Figure 8A:
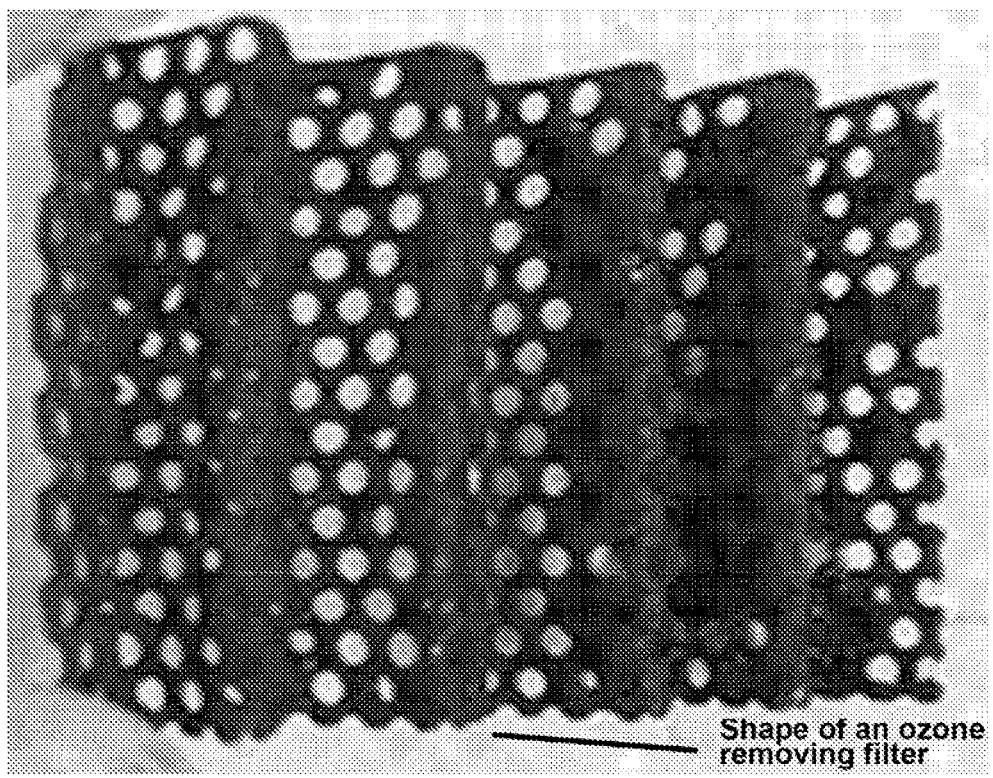
FIG. 8A is a picture illustrating the shape of an ozone removing filter.

Manufacture of Respirator Having Ozone Removing Filter Including Manganese Oxide First, a mesh type filter is formed of aluminum and the ozone removing filter including manganese oxide is manufactured by coupling manganese oxide powder to a surface of the mesh type filter. At this time, the manganese oxide powder is coupled through the spray coating or the inkjet printing (FIG. 8A). FIG. 8A is a picture illustrating a shape of the ozone removing filter manufactured in the present invention.

Figure 8B:
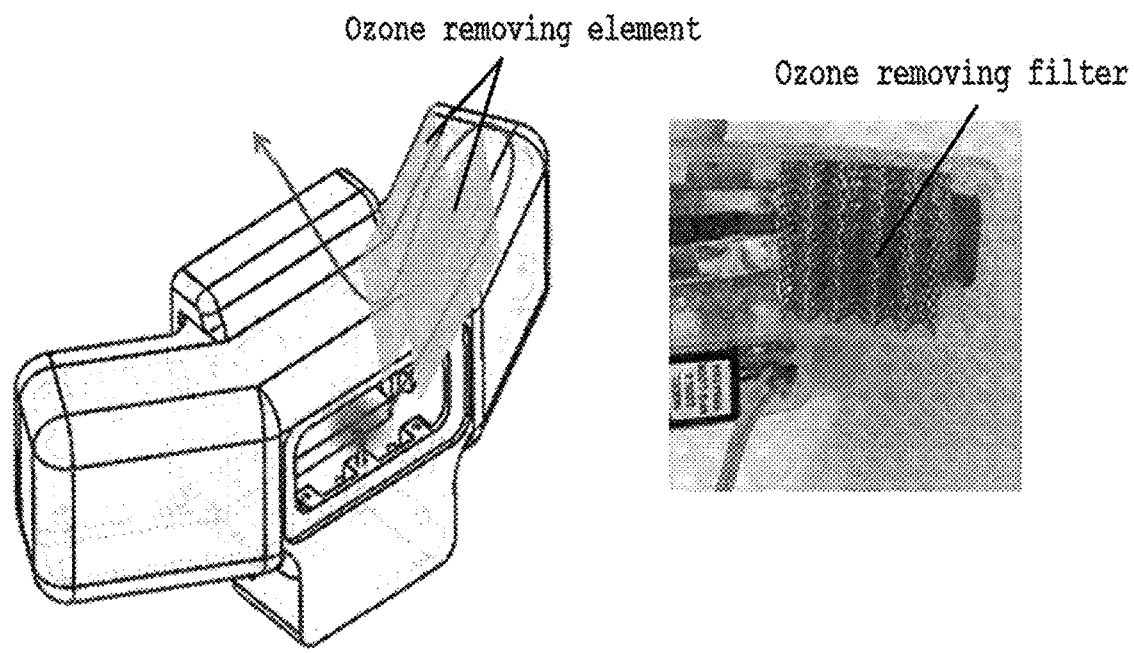
FIG. 8B is a schematic view illustrating a structure of the respirator having the micro-plasma and the ozone removing filter.

Next, the body of the respirator is designed and is manufactured through 3D printing, and the asymmetrical electrodes that generate the micro-plasma, the particle capturing plates and the manufactured ozone removing filter are mounted on the interior of the manufactured body (FIG. 8B).

FIG. 8B is a schematic view illustrating a structure of the respirator having the asymmetrical electrodes that generate the micro-plasma, particle capturing plates and the ozone removing filter.

Example 2-2

Evaluation of Ozone Removing Effect of Respirator Having Ozone Removing Filter Including Manganese Oxide The ozone removing effect is evaluated using the respirator manufactured in example 2-1.

In detail, the micro-plasma is generated in the respirator manufactured in example 2-1 and a control group respirator not having the ozone removing filter. A concentration of ozone generated therefrom is measured according to the passage of time (FIG. 8C).

Figure 8C:
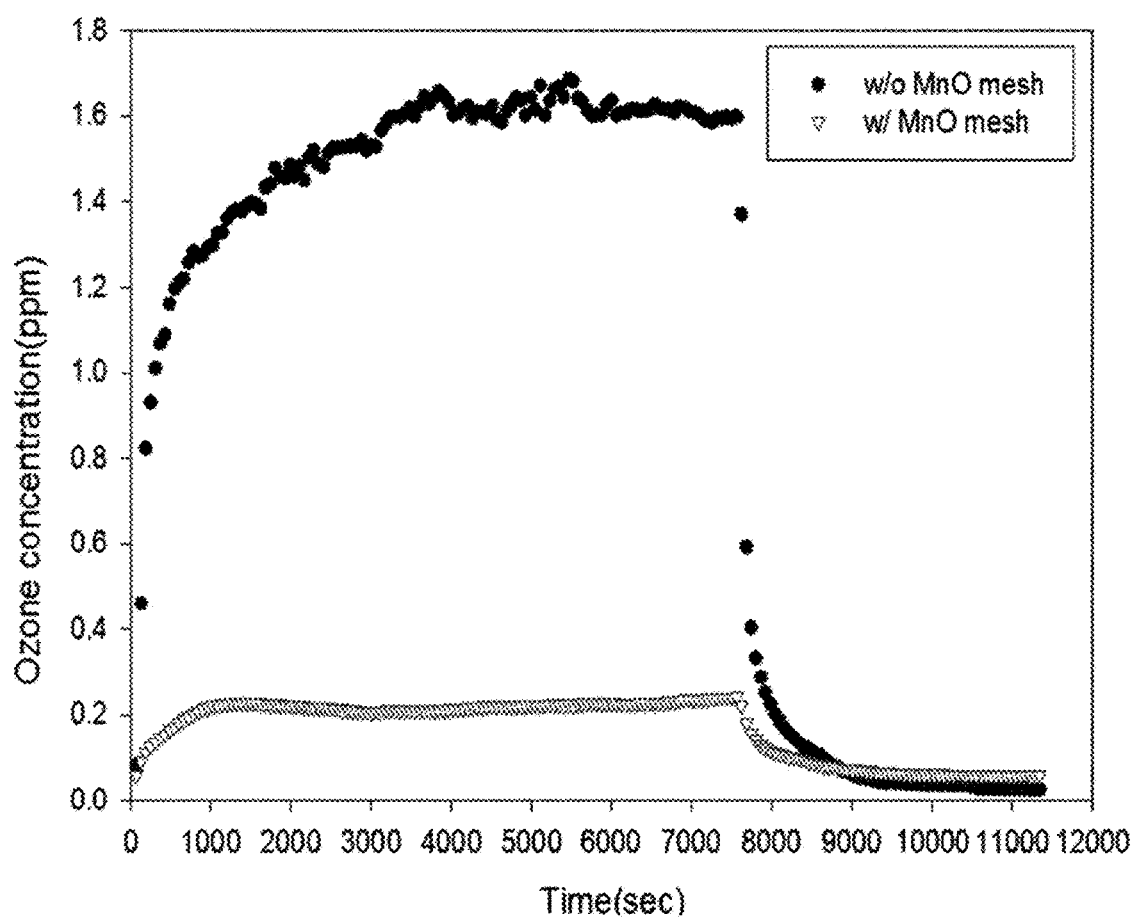
FIG. 8C is a graph depicting a result obtained by measuring a change in a concentration of ozone generated by the micro-plasma performed in the respirator to which the ozone removing filter including manganese oxide is mounted, wherein ∇ corresponds to the respirator to which the ozone removing filter including manganese oxide is mounted, and ● corresponds to a control group respirator in which the ozone removing filter is not provided.
Figure 9:
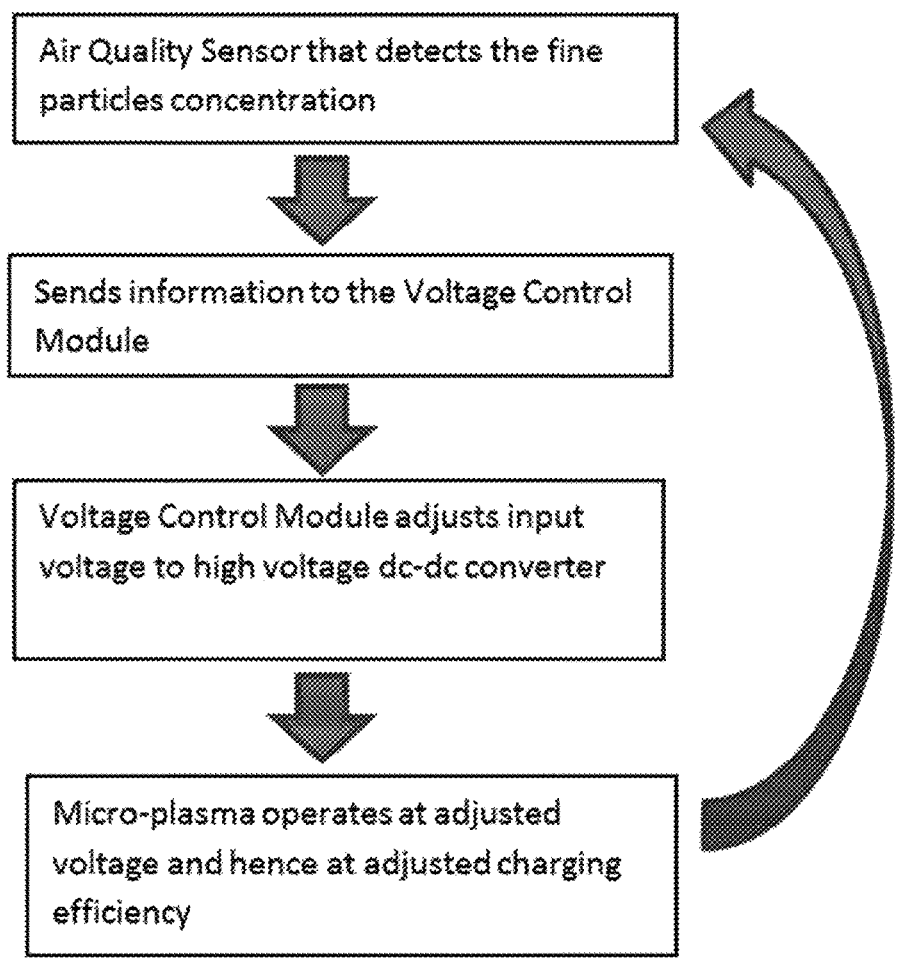
FIG. 9 is a schematic view illustrating a process of operating the air quality feedback element.

FIG. 8C is a graph depicting a result obtained by measuring a change in a concentration of ozone generated when the micro-plasma is generated in the respirator on which the ozone removing filter including manganese oxide is mounted, wherein ∇ corresponds to the respirator to which the ozone removing filter including manganese oxide is mounted, and ● corresponds to a control group respirator in which the ozone removing filter is not provided.

As illustrated in FIG. 8C, it is identified that ozone is generated at a level of about 1.7 ppm in the control group respirator (●) not having the ozone removing filter but ozone is generated at a level of about 0.3 ppm in the respirator (∇) on which the ozone removing filter including manganese oxide is mounted. The ozone level can be further reduced to a safe level below 0.03 ppm with a denser or modified manganese oxide ozone removing filter.

Thus, it can be identified that when the manganese oxide filter is used, ozone generated through the micro-plasma is effectively removed, so that the respirator may be safely mounted.

What is claimed is:
1. A respirator comprising:
(a) a body;
(b) an unobstructed air inlet duct that is provided at a portion of the body, passes through an inside and an outside of the body;
(c) a pair of asymmetrical electrodes that generates a micro-plasma and a pair of particle capturing plates formed on an inner surface of the air inlet duct;
(d) an ozone removing element, within the air inlet duct downstream of the asymmetrical electrodes and particle capturing plates, that removes ozone generated by the micro-plasma;
(e) a high voltage dc-dc converter within the body to provide high voltage to power the asymmetrical electrodes; and
(f) an air quality feedback element comprising an optical sensor that detects fine particle count and a voltage control module that adjust the high voltage dc-dc converter.

2. The respirator of claim 1, wherein each asymmetrical electrode comprises a pin electrode and a plate electrode, and generates asymmetrical electric field so that forms a micro-plasma on the pin electrode.

3. The respirator of claim 2, wherein the pin electrode is formed of stainless steel and the plate electrode is formed of aluminum.

4. The respirator of claim 1, wherein the particle capturing plates form an electric field and is formed of stainless steel or aluminum.

5. The respirator of claim 1, wherein the micro-plasma electrically charges fine particles in the air which pass through the air inlet duct, and the electrically charged fine particles are captured by an electric field generated by the particle capturing plates on the surface of the air inlet duct as the air moves through the air inlet duct.

6. The respirator of claim 5, wherein the fine particles comprises airborne pathogenic bacteria, viruses, fungi, spores, or fine dust.

7. The respirator of claim 1, wherein the body is for mounting on a face to cover a nose and a mouth.

8. The respirator of claim 1, wherein no pressure drop is generated as the air passes through and exits the air inlet duct.

9. The respirator of claim 1, wherein the ozone removing element is formed of manganese oxide or manganese dioxide.

10. The respirator of claim 1, wherein the ozone removing element is formed of a surface film, a mesh filter, and a three-dimensional scaffold which does not pose as an obstruction to air flow.

11. The respirator of claim 1, wherein the high voltage DC-DC converter may generate an output high DC voltage of up to 1.5 to 5.0 kilovolts from an input low DC voltage of 5 volts or less to provide the high DC voltage to the asymmetrical electrodes.

12. The respirator of claim 1, wherein the fine particle charging efficiency of the micro-plasma is controlled when the high voltage dc-dc converter is controlled.

13. The respirator of claim 1, wherein the body further comprises an inlet guard element that prevents contact between the micro-plasma and a user.

14. The respirator of claim 1, wherein further comprising a power supply element that supplies electric power to the high voltage dc-dc converter.

15. The respirator of claim 14, wherein the power supply element may be batteries or a mobile device.

16. The respirator of claim 1, wherein the voltage control module adjusts the high voltage dc-dc converter according to the amount of fine particle detected by optical sensor in order to optimize electrical power consumption.

17. The respirator of claim 1, wherein the air quality feedback element displays fine particles concentration and micro-plasma voltage on a mobile device.

18. The respirator of claim 1, wherein the air quality feedback element further comprises a signal transfer element.

19. The respirator of claim 18, wherein the signal transfer element is a warning alarm to alert the wearer or an LED indicator light.

20. The respirator of claim 18, wherein the air quality feedback element activates a signal transfer element upon detecting a hazardous level of fine particles.

* * * * *